US012634494B2

(12) United States Patent
Xu et al.

(10) Patent No.: US 12,634,494 B2
(45) **Date of Patent: \*May 19, 2026**

(54) MANAGEMENT OF HMVP BUFFER FOR PARALLEL CODING

(71) Applicant: TENCENT AMERICA LLC, Palo Alto, CA (US)

(72) Inventors: Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,657

(22) Filed: May 25, 2023

(65) Prior Publication Data

US 2023/0300358 A1     Sep. 21, 2023

Related U.S. Application Data

(63) Continuation of application No. 17/943,405, filed on Sep. 13, 2022, now Pat. No. 11,722,683, which is a
(Continued)

(51) Int. Cl.
*H04N 19/436* (2014.01)
*H04N 19/176* (2014.01)
(Continued)

(52) U.S. Cl.
CPC ......... *H04N 19/436* (2014.11); *H04N 19/176* (2014.11); *H04N 19/423* (2014.11); *H04N 19/44* (2014.11)

(58) Field of Classification Search
CPC .. H04N 19/436; H04N 19/176; H04N 19/423; H04N 19/44
See application file for complete search history.

(56) References Cited

U.S. PATENT DOCUMENTS 8,526,495 B2     9/2013 Liu et al.
9,049,452 B2     6/2015 Liu et al.
(Continued)

FOREIGN PATENT DOCUMENTS

CN     105981380 A     9/2016
JP     2015-526969 A     9/2015
(Continued)

OTHER PUBLICATIONS

Xu et al. "CE4-related: CTU-level Initialization of History-based Motion Vector Prediction", JVET-L0575, Oct. 2018.*
(Continued)

*Primary Examiner* — James T Boylan
(74) *Attorney, Agent, or Firm* — ArentFox Schiff LLP

(57) ABSTRACT

A method of video encoding includes, prior to encoding a first tile of s plurality of tiles of a current picture, initializing a shared row buffer that is shared among multiple processor threads associated with the first tile. The method also includes encoding a first unit of a plurality of units in a first row of the first tile by a first processor thread and using a corresponding first HMVP buffer. The method also includes, when all of the plurality of blocks in the first unit have been encoded, copying contents of the first HMVP buffer into the shared row buffer, copying contents of the shared row buffer into a second HMVP buffer, starting encoding of a unit in a second row of the plurality of rows by the second processor thread using the second HMVP buffer, and resetting the first HMVP buffer.

11 Claims, 14 Drawing Sheets

Related U.S. Application Data continuation of application No. 16/544,331, filed on Aug. 19, 2019, now Pat. No. 11,496,759, which is a continuation of application No. 16/213,705, filed on Dec. 7, 2018, now Pat. No. 10,440,378.

(60) Provisional application No. 62/699,372, filed on Jul. 17, 2018.

(51) Int. Cl.
  *H04N 19/423* (2014.01)
  *H04N 19/44* (2014.01)

(56) References Cited

U.S. PATENT DOCUMENTS

| | | | | |
|---|---|---|---|---|
| 9,510,012 | B2 | 11/2016 | Liu et al. | |
| 9,813,726 | B2 | 11/2017 | Liu et al. | |
| 9,961,358 | B2 | 5/2018 | Liu et al. | |
| 10,440,378 | B1 | 10/2019 | Xu et al. | |
| 10,743,016 | B2 * | 8/2020 | Lai | H04N 19/70 |
| 10,778,997 | B2 * | 9/2020 | Zhang | H04N 19/513 |
| 11,496,759 | B2 * | 11/2022 | Xu | H04N 19/423 |
| 11,722,683 | B2 * | 8/2023 | Xu | H04N 19/436 375/240.26 |
| 2008/0043845 | A1 | 2/2008 | Nakaishi | |
| 2010/0265342 | A1 | 10/2010 | Liang et al. | |
| 2011/0210874 | A1 | 9/2011 | Korodi et al. | |
| 2015/0208075 | A1 * | 7/2015 | Eckart | H04N 19/43 375/240.16 |
| 2016/0295225 | A1 | 10/2016 | Takano | |
| 2016/0323591 | A1 | 11/2016 | Chuang et al. | |
| 2017/0208335 | A1 | 7/2017 | Ramamurthy et al. | |
| 2018/0084284 | A1 | 3/2018 | Rosewarne et al. | |
| 2018/0278948 | A1 | 9/2018 | Matsuba et al. | |
| 2020/0014948 | A1 * | 1/2020 | Lai | H04N 19/172 |
| 2020/0021839 | A1 * | 1/2020 | Pham Van | H04N 19/436 |
| 2020/0186820 | A1 * | 6/2020 | Park | H04N 19/423 |

FOREIGN PATENT DOCUMENTS

| | | |
|---|---|---|
| JP | 2021-524718 A | 9/2021 |
| KR | 10-2013-0045785 A | 5/2013 |
| KR | 10-2016-0101040 A | 8/2016 |

OTHER PUBLICATIONS

Chen et al., "CE4-related: Modified History-based MVP to support parallel processing," Joint Video Experts Team (JV ET) of ITU-T SG 16 WP 3 and ISO/IEC JTC 1/SC 29/WG 11 12th Meeting: Macao, CN, Oct. 3-12, 2018, [JVET-L0106], JVET-L0106 (version 4),ITU-T,2018 (3 pages).

Chi et al., "Parallel Scalability and Efficiency of HEVC Parallelization Approaches", IEEE Transactions on Circuits and Systems for Video Technology, vol. 22 Issue 12, pp. 1827-1838, Dec. 2012.

Extended European Search Report and Search Opinion received for European Application No. 19837234.4, mailed on Feb. 8, 2022, 4 pages.

High Efficiency Video Coding (HEVC), Rec. ITU-T H.265 v4, Dec. 2016.

International Search Report and Written Opinion received for PCT Patent Application No. PCT/US2019/038995, mailed on Aug. 2, 2019, 9 pages.

L. Zhang et al., "CE4-related: History-based Motion Vector Prediction", JVET-K0104, Jul. 2018.

Liu et al., "Improved Video Coding via Adaptive Selection of Generalized Motion Prediction Modes for B Frames," in the Picture Coding Symposium 2001, Apr. 2001.

Liu et al., "MCI-embedded motion-compensated prediction for quality enhancement of frame interpolation" in Multimedia Systems and Applications III, vol. 4209, p. 251-262, Mar. 2001.

Liu et al., "Nonlinear motion-compensated interpolation for low-bit-rate video" in Applications of Digital Image Processing XXIII, vol. 4115, p. 203-214, Dec. 2000.

Office Action received for Chinese Patent Application No. 201980021470.7, mailed on Jul. 4, 2022, 11 pages 5 pages of English Translation and 6 pages of Original Document).

Office Action received for Japanese Patent Application No. 2020-551396, mailed on Oct. 26, 2021, 12 pages (6 pages of English Translation and 6 pages of Original Document).

Office Action received for Korean Patent Application No. 10-2020-7026807, mailed on May 9, 2022, 9 pages (5 pages of English Translation and 4 pages of Original Document).

Park (LGE) N et al: "CE4 related: History-Based Motion Vector Prediction considering parallel processing", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0158, Oct. 6, 2018, 9 pages.

Sullivan et al. "Overview of High Efficiency Video Coding Standard (HEVC) Standard", IEEE transactions, vol. 22, No. 12, Dec. 2012, p. 1652 (Year: 2012).

Xu et al., "CE2: Test 3.2—Intra BC merge mode with default candidates", ISO/IEC JTC1/SC29/WG11 JCTVC-T0073, Feb. 2015.

Xu et al., "Non-CE2: Intra BC merge mode with default candidates", ISO/IEC JTC1/SC29/WG11 JCTVC-S0123, Oct. 2014.

Yang et al., "Description of Core Experiment 4 (CE4): Inter prediction and motion vector coding", ISO/IEC JTC1/SC29/WG11 JVET-J1024, Apr. 2018.

* cited by examiner

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |

*FIG. 8*

| Reference List | MV | MVP | MVD |
|---|---|---|---|
| L0 | MV0 | MVP0 | MVD0 = MV0 − MVP0 |
| L1 | MV1 | MVP1+MVD0 | MVD1 = MV1 − MVP1 − MVD0 |

*FIG. 9*

| HMVP_0 | HMVP_1 | HMVP_2 | HMVP_3 | HMVP_4 |
|--------|--------|--------|--------|--------|
| [0] | [1] | [2] | [3] | [4] |

FIG. 10A

| HMVP_1 | HMVP_2 | HMVP_3 | HMVP_4 | CL_0 |
|--------|--------|--------|--------|------|
| [0] | [1] | [2] | [3] | [4] |

FIG. 10B

|              | CTU_00 | CTU_01 | CTU_02 | CTU_03 |
|--------------|--------|--------|--------|--------|
| CTU_Row_[0]  |        |        |        |        |
| CTU_Row_[1]  | CTU_10 | CTU_11 | CTU_12 | CTU_13 |
| CTU_row_[2]  | CTU_20 | CTU_21 | CTU_22 | CTU_23 |

MANAGEMENT OF HMVP BUFFER FOR PARALLEL CODING

INCORPORATION BY REFERENCE

The present application is a continuation of U.S. application Ser. No. 17/943,405, "PARALLEL CODING USING HISTORY-BASED MOTION VECTOR PREDICTION WITH SHARED ROW BUFFERS" filed on Sep. 13, 2022, which is a continuation of U.S. application Ser. No. 16/544, 331, "METHOD AND APPARATUS FOR HISTORY-BASED MOTION VECTOR PREDICTION WITH PAR-ALLEL PROCESSING" filed on Aug. 19, 2019, now U.S. Pat. No. 11,496,759, which is a continuation of U.S. patent application Ser. No. 16/213,705, "METHOD AND APPA-RATUS FOR HISTORY-BASED MOTION VECTOR PRE-DICTION WITH PARALLEL PROCESSING" filed on Dec. 7, 2018, now U.S. Pat. No. 10,440,378, which claims the benefit of priority to U.S. Provisional Application No. 62/699,372, "TECHNIQUES FOR MOTION VECTOR DIFFERENCE CODING IN BI-DIRECTIONAL MOTION COMPENSATION" filed on Jul. 17, 2018. The benefit of priority is claimed to each of the foregoing, and the entire contents of each of the foregoing are incorporated herein by reference.

TECHNICAL FIELD

The present disclosure describes embodiments generally related to video coding.

BACKGROUND

The background description provided herein is for the purpose of generally presenting the context of the disclo-sure. Work of the presently named inventors, to the extent the work is described in this background section, as well as aspects of the description that may not otherwise qualify as prior art at the time of filing, are neither expressly nor impliedly admitted as prior art against the present disclo-sure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 lumi-nance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the recon-structed signal useful for the intended application. In the case of video, lossy compression is widely employed. The amount of distortion tolerated depends on the application; for example, users of certain consumer streaming applica-tions may tolerate higher distortion than users of television contribution applications. The compression ratio achievable can reflect that: higher allowable/tolerable distortion can yield higher compression ratios.

Motion compensation can be a lossy compression tech-nique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruc-tion, and preceding that MV in decoding order. Doing so can substantially reduce the amount of data required for coding the MV, thereby removing redundancy and increasing com-pression. MV prediction can work effectively, for example, because when coding an input video signal derived from a camera (known as natural video) there is a statistical like-lihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

A history buffer of motion vector predictors may be used to perform encoding or decoding. Generally, the mainte-nance of the history buffer is performed after each block, in encoding or decoding order, is completed. If this block is coded in inter mode with a set of MV information, the MV of this block is put into HMVP buffer for updating the buffer. When encoding or decoding the current block, the MV predictors for the current block may come from previously coded spatial/neighboring blocks. Some of these blocks may still be in the HMVP buffer. When putting a newly decoded/ encoded MV into the HMVP buffer, some comparisons may be performed to make sure the new MV is different from all previous ones in the HMVP buffer. If there is already an MV with the same value in the buffer, the old MV will be removed from the buffer, and the new MV is put into the buffer as the last entry. These general maintenance proce-dures of the history buffer do not properly reset the history buffer when necessary to remove information from the history buffer that may not be relevant for a current block being encoded or decoded. Furthermore, encoding or decoding of a block using a history buffer doesn't properly take into account parallel processing of the block.

SUMMARY

An exemplary embodiment of the present disclosure includes a method for video decoding. The method includes acquiring a current picture from a coded video bitstream, where the current picture is segmented into a plurality of units, each unit is divided into a plurality of blocks, and the plurality of blocks in each unit being arranged as a grid. The method further includes decoding, for one of the units, a current block from the plurality of blocks using an entry from a history motion vector (HMVP) buffer. The method further includes updating the HMVP buffer with a motion vector of the decoded current block. The method further includes determining whether a condition is satisfied, the condition specifying that (i) the current block is a beginning of a row included in the grid of the one of the units, and (ii) the plurality of blocks are decoded in accordance with a parallel process. The method further includes, in response to determining that the condition is satisfied, resetting the HMVP buffer.

An exemplary embodiment of the present disclosure includes a video decoder. The video decoder includes processing circuitry configured to acquire a current picture from a coded video bitstream, where the current picture is segmented into a plurality of units, each unit is divided into a plurality of blocks, and the plurality of blocks in each unit being arranged as a grid. The processing circuitry further configured to decode, for one of the units, a current block from the plurality of blocks using an entry from a history motion vector (HMVP) buffer. The processing circuitry further configured to update the HMVP buffer with a motion vector of the decoded current block. The processing circuitry further configured to determine whether a condition is satisfied, the condition specifying that (i) the current block is a beginning of a row included in the grid of the one of the units, and (ii) the plurality of blocks are decoded in accordance with a parallel process. The processing circuitry further configured to in response to the determination that the condition is satisfied, reset the HMVP buffer.

An exemplary embodiment of the present disclosure includes non-transitory computer readable medium having instructions stored therein, which when executed by a processor in a video decoder causes the processor to execute a method. The method includes acquiring a current picture from a coded video bitstream, where the current picture is segmented into a plurality of units, each unit is divided into a plurality of blocks, and the plurality of blocks in each unit being arranged as a grid. The method further includes decoding, for one of the units, a current block from the plurality of blocks using an entry from a history motion vector (HMVP) buffer. The method further includes updating the HMVP buffer with a motion vector of the decoded current block. The method further includes determining whether a condition is satisfied, the condition specifying that (i) the current block is a beginning of a row included in the grid of the one of the units, and (ii) the plurality of blocks are decoded in accordance with a parallel process. The method further includes, in response to determining that the condition is satisfied, resetting the HMVP buffer.

BRIEF DESCRIPTION OF THE DRAWINGS

Further features, the nature, and various advantages of the disclosed subject matter will be more apparent from the following detailed description and the accompanying drawings in which:

FIG. 8 illustrates example syntax of coding a motion vector difference (MVD).

FIG. 9 illustrates an example of predictive coding of a second MVD using a first MVD as a predictor.

FIGS. 10A and 10B illustrate an embodiment of a history based motion vector prediction buffer.

FIG. 11 illustrates an example picture partitioned into coding tree units.

DETAILED DESCRIPTION OF EMBODIMENTS

Figure 1:
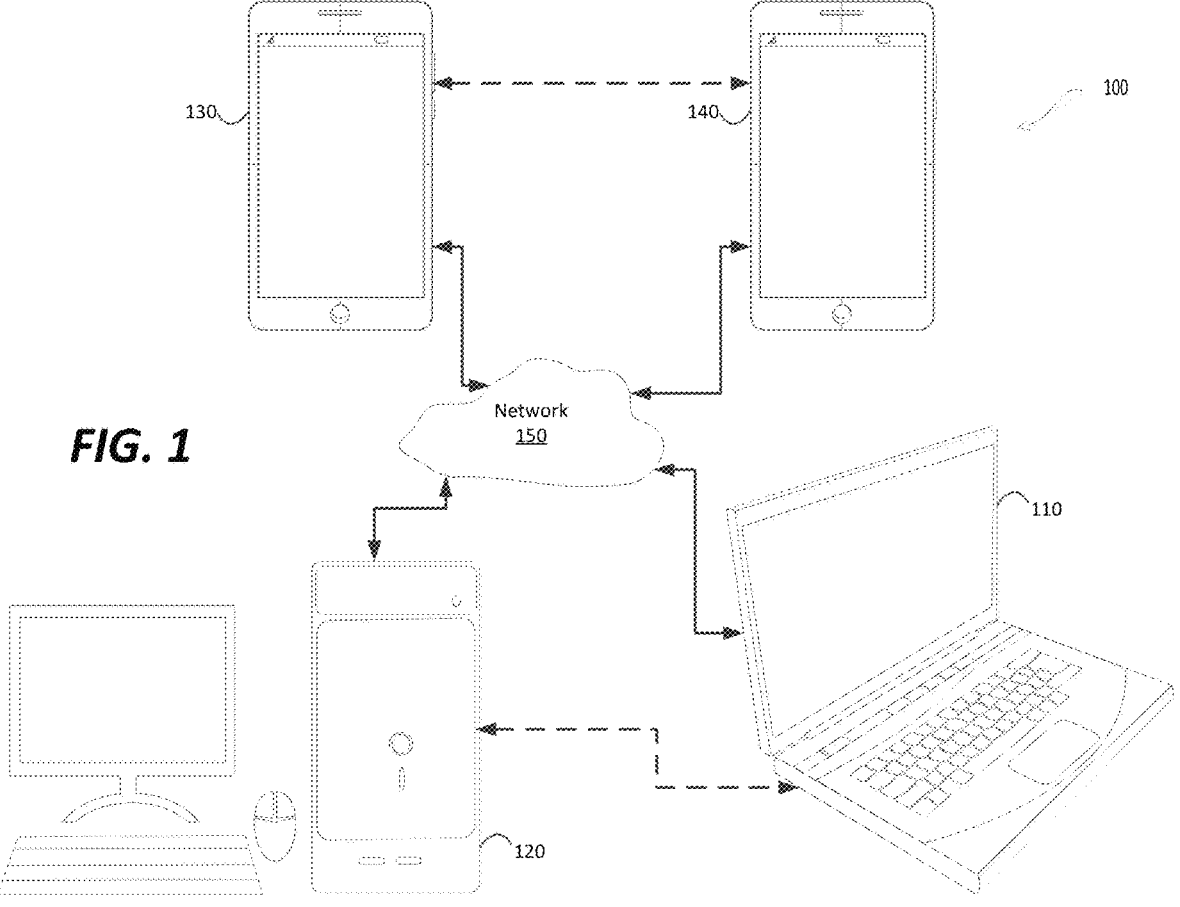
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
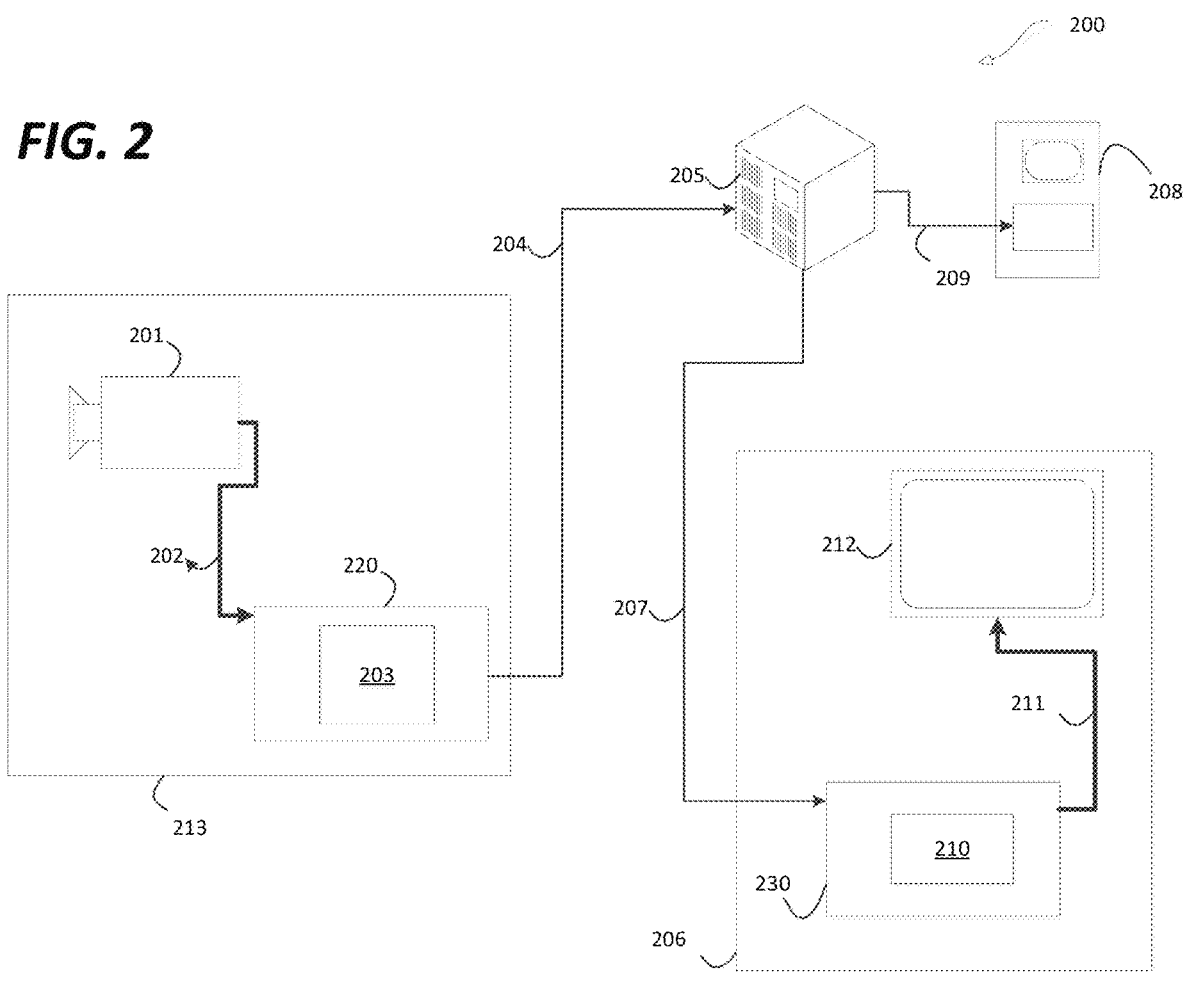
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
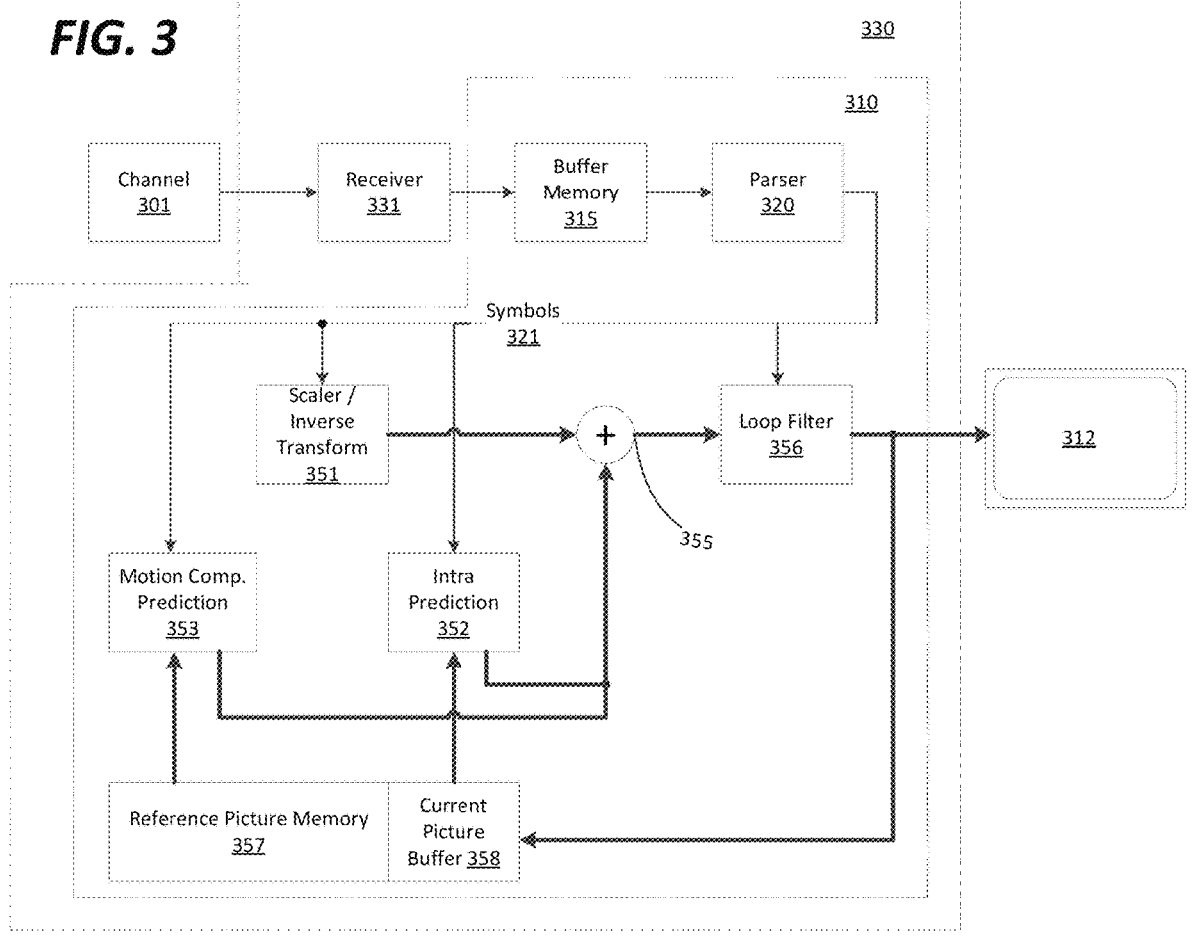
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
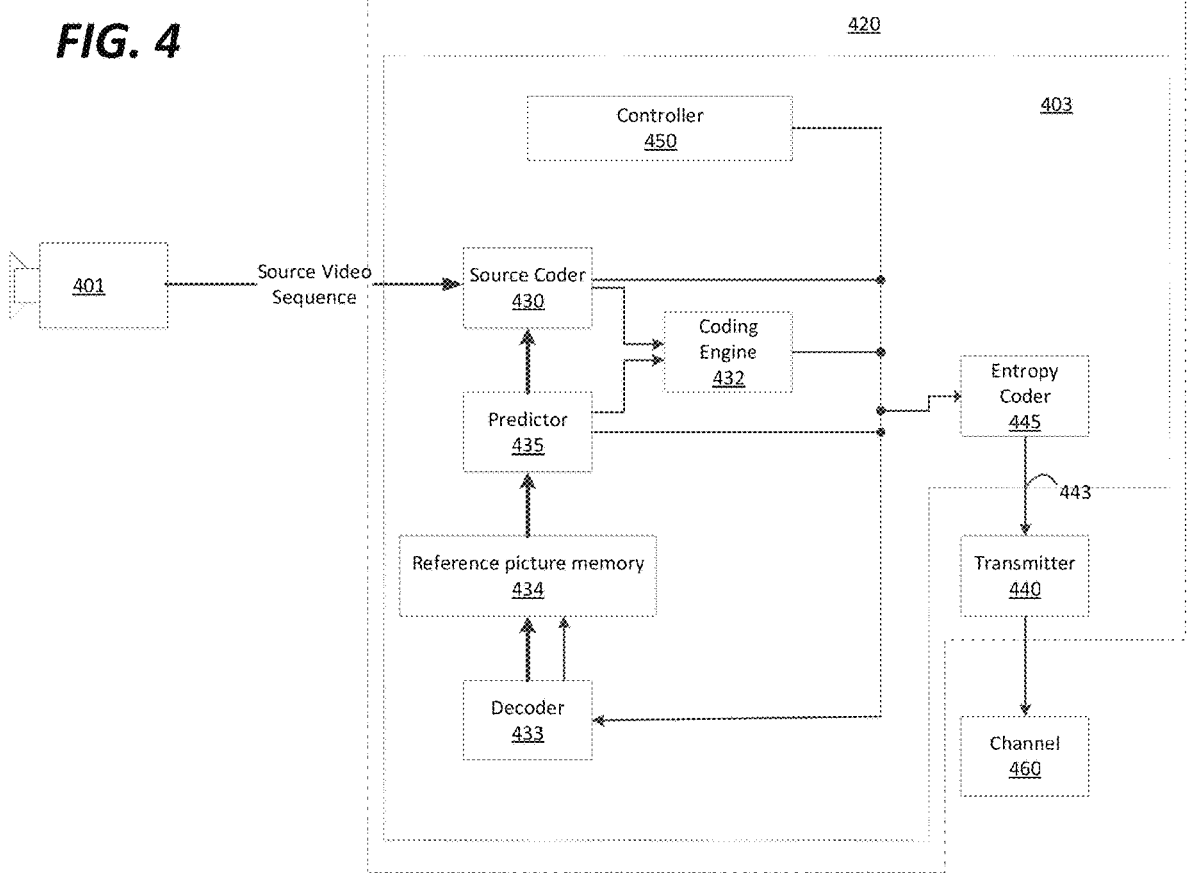
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bit-stream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one coding unit (CU) of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
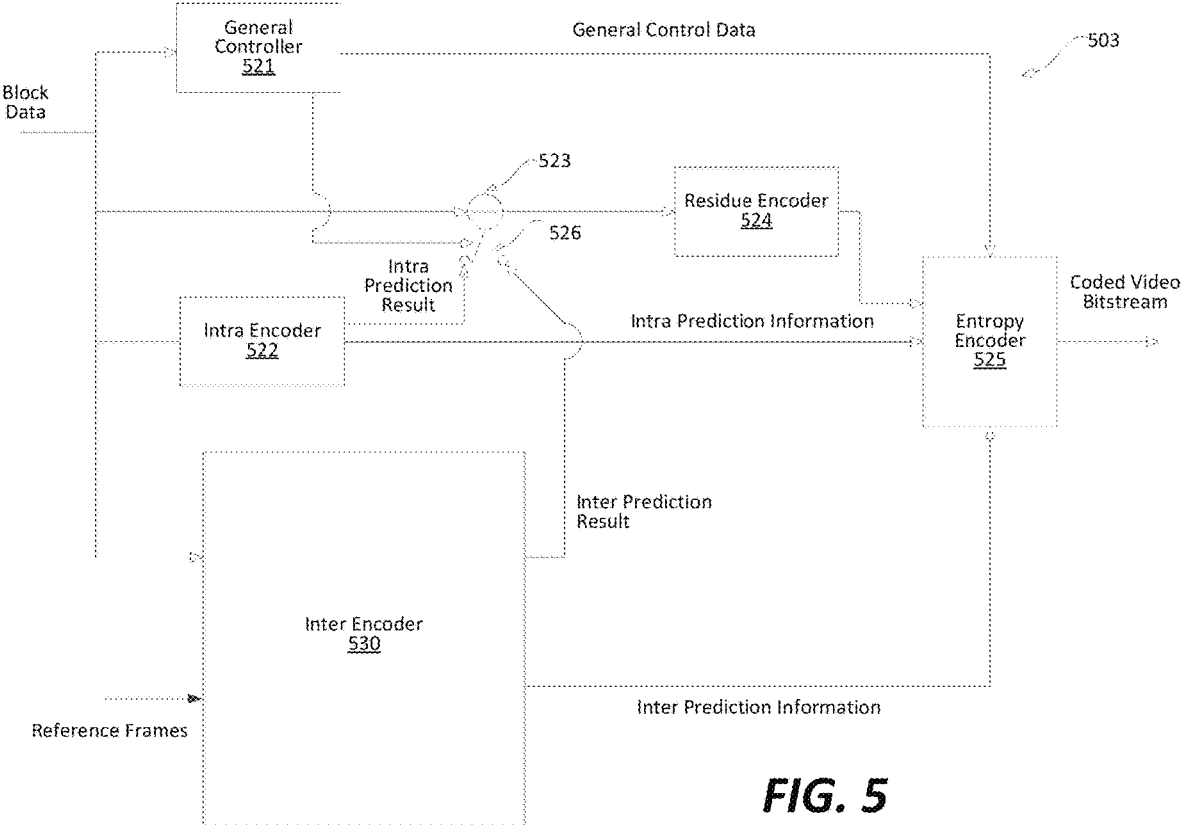
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data in the frequency domain, and generate the transform coefficients. The transform coefficients are then subject to quantization processing to obtain quantized transform coefficients.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
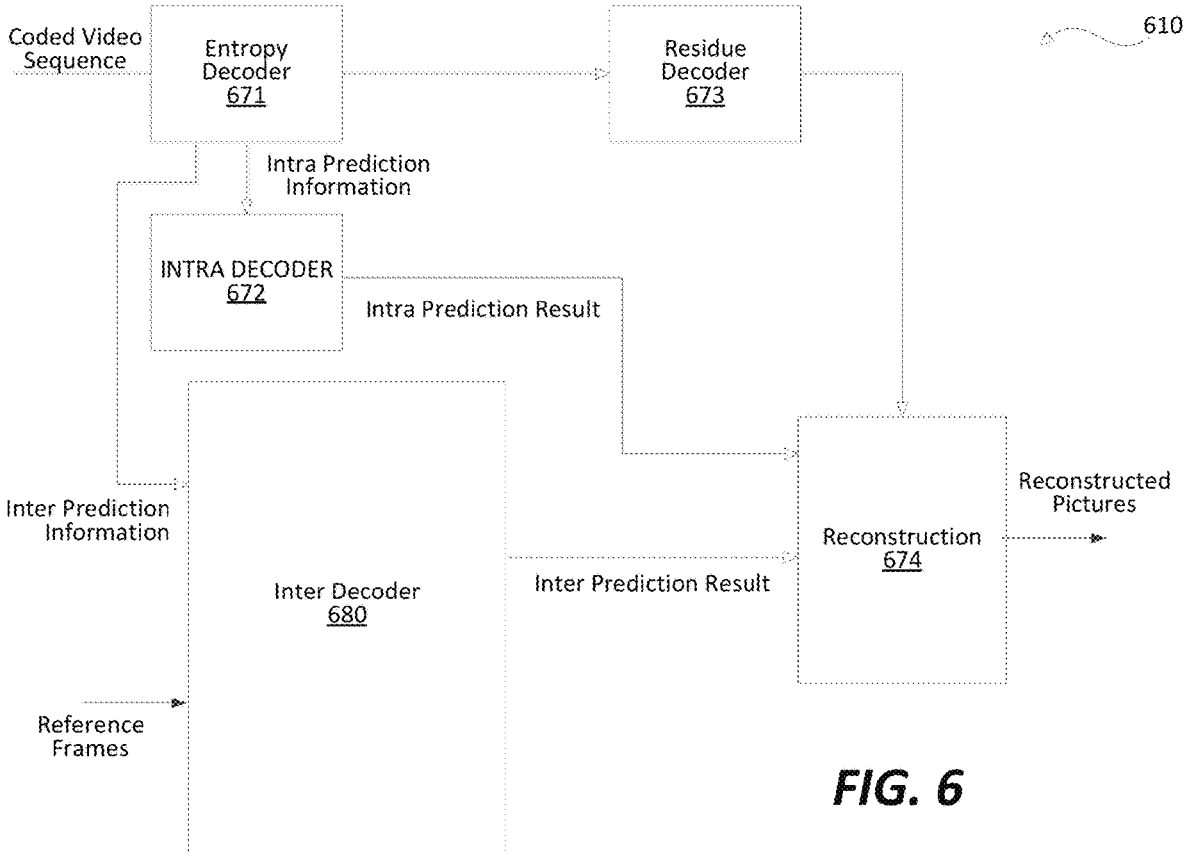
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

According to some embodiments, a motion vector (MV) for a block can be coded either in an explicit way, to signal the difference between a motion vector predictor, or in an implicit way, to be indicated as derived from one previously coded or generated motion vector, or motion vector pair if coded using bi-directional prediction. The implicit coding of a motion vector may be referred to as merge mode, where a current block is merged into a previously coded block by sharing the motion information of the previously coded block.

Figure 7:
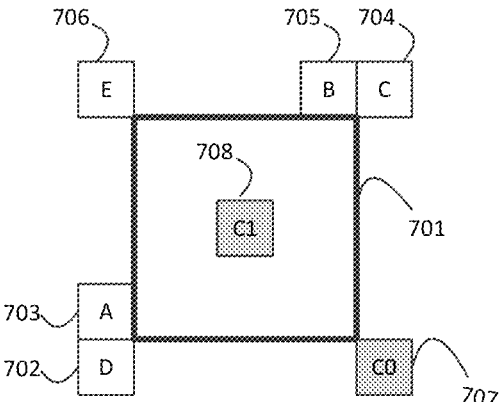
FIG. 7 is a schematic illustration of a current block and surrounding spatial merge candidates.

Merge candidates may be formed by checking motion information from either spatial or temporal neighbouring blocks of the current block. Referring to FIG. 7, a current block (701) comprises samples that have been found by the encoder/decoder during the motion search process to be predictable from a previous block of the same size that has been spatially shifted. In some embodiments, instead of coding that motion vector directly, the motion vector can be derived from metadata associated with one or more reference pictures, for example, from a most recent (in decoding order) reference picture, using the motion vector associated with either one of five surrounding samples, denoted D, A, C, B, and E (702 through 706, respectively). The blocks A, B, C, D, and E may be referred to as spatial merge candidates. These candidates may be sequentially checked into a merge candidate list. A pruning operation may be performed to make sure duplicated candidates are removed from the list.

In some embodiments, after putting spatial candidates into the merge list, temporal candidates are also checked into the list. For example, a current block's collocated block in a specified reference picture is found. The motion information at the C0 position (707) in the reference picture is used as a temporal merge candidate. The C0 position may be a block in the reference picture in which the top left corner of this block is at a bottom right corner of a collocated block in the reference picture of the current block 701. The collocated block in the reference picture may include the same position coordinates (e.g., x and y coordinates) as the current block 701. If the block at the C0 position (707) is not coded in an inter mode or is not available, the block at the Cl position may be used. The block at the Cl position may have a top left corner at a center location (e.g., w/2, h/2) of a block within the collocated block in the reference picture. Particularly, the block at position Cl may be a sub-block of the collocated block in the reference picture. In the above example, w and h are the width and height of the block, respectively. According to some embodiments, additional merge candidates include combined bi-predictive candidates and zero motion vector candidates.

According to some embodiments, Advanced Motion Vector Prediction (AMVP) uses spatial and temporal neighboring blocks' motion information to predict the motion information of a current block, while the prediction residue is further coded. The AMVP mode may also be referred to as the residue mode. FIG. 7 illustrates examples of spatial and temporal neighboring candidates. In an example of the AMVP mode, a two-candidate motion vector predictor list is formed. The first candidate predictor is from a first available motion vector from the left edge in the order of the spatial A0 and A1 positions. The second candidate predictor is from a first available motion vector from the top edge, in the order of spatial B0, B1, and B2 positions. If no valid motion vector is found from the checked locations for either the left edge or the top edge, no candidate will be filled in the motion vector predictor list. If the two candidates are available and are the same, one candidate is kept in the motion vector predictor list. If the motion vector predictor list is not full with two different candidates, the temporal collocated block's motion vector in the reference picture, after scaling, at the C0 location is used as another candidate. If motion information at the collocated block of the C0 location in the reference picture is not available, the collocated block of location C1 in the reference picture is used instead. If, after checking the spatial and temporal candidates, there are still not enough motion vector predictor candidates, the zero motion vector is used to fill up the motion vector predictor list.

According to some embodiments, in AMVP mode, after a motion vector is predicted by a MV prediction, the residue part is referred as a motion vector difference (MVD), which also has x and y components. The coding of the MVD may involve (i) a binarization of a difference value in each component and (ii) context modeling for some of the binarized bins.

In a bi-directional predicted slice (B_slice), each block may be coded in either a forward prediction (i.e., predicted from a reference picture in list 0 or L0), a backward prediction (i.e., predicted from a reference picture in list 1 or L1), or a bi-directional prediction (i.e., predicted from two reference pictures one in list 0 and one in list 1). The former two cases may also be referred to as a uni-directional prediction. In some embodiments, if the bi-directional prediction is used in a coded block, there is a pair of motion vectors pointing to the two reference pictures. Furthermore, there is a pair of MVDs to be coded, which may be coded independently by existing video coding standards. FIG. 8 illustrates example syntax in which the pair of MVDs are coded independently.

Embodiments of the present disclosure include improved techniques for MVD coding by exploring correlations between the pair of MVDs when bi-directional prediction is used. The embodiments of the present disclosure improve coding efficiency in the bi-directional prediction. In this regard, the MVD of a first MV is used to predict the MVD of a second MV. After being predicted by the first MVD, the second MVD residue is further coded using an original MVD coding module, or a modified MVD coding module.

According to some embodiments, more than one motion vector in a block needs to be coded, the MVD of a first vector is used as a predictor to predict the MVD(s) of the other MVs in the block. Using the bi-directional mode as an example, where a pair of MVs are to be coded, the MVD1 is predicted by MVD0, before performing entropy coding for this MV difference.

FIG. 9 illustrates an embodiment of a prediction scheme, where MVx is the motion vector in List x (x=0, 1), MVPx is the motion vector predictor in List x, and MVDx is the motion vector difference in List x. As illustrated in FIG. 9, the second MVD (i.e., MVD1) is predicted using the first MVD (i.e., MVD0) as a predictor. Each of MVP0 and MVP1 may come from spatial or temporal neighboring blocks' motion vectors. When there are more than 1 motion vector candidates, for each of MVP0 and MVP1, an index may be signaled to choose from the candidate list.

According to some embodiments, conditions on whether the MVD1 is predicted from MVD0 may be specified. For example, MVD1 may be predicted from MVD0 only when (i) the reference picture from L0 has a picture order count (POC) number smaller than a POC of a current picture, and (ii) the reference picture from L1 has a POC number larger than the POC of the current picture. In another example, MVD1 may be predicted from MVD0 only when (ii) the reference picture from L0 has a POC number larger than the POC of the current picture, and (ii) the reference picture from L1 has a POC number smaller than the POC of the current picture.

In some embodiments, both MVD0 and MVD1 go through a same MVD entropy coding module that is designed also for other situations where only one MVD coding is performed. In another embodiment, the MVD0 goes through a same MVD entropy coding module that is designed also for other situations where only one MVD coding is performed.

Embodiments of the present disclosure disclose several methods of getting motion vector predictors for inter-picture prediction coding. These methods include storing N previously coded blocks' MV predictors in a history-based MV (HMVP) buffer. This buffer with multiple HMVP candidates is maintained during the encoding/decoding process. The buffer may operate in a first-in-first-out (FIFO) principle such that the most recent coded motion information is firstly considered when this buffer is used during motion vector prediction.

These methods may be applied to both merge mode or AMVP mode. The embodiments of the present disclosure may be extended to any video coding method that uses the merge and general MV prediction concepts. Embodiments of the present disclosure may also be applied to the skip mode since this mode uses the merge mode to derive the motion information.

FIGS. 10A and 10B illustrate an HMVP buffer before and after a candidate is inserted, respectively. As illustrated in FIGS. 10A and 10B, the HMVP buffer includes 5 entries with the index [0] to [4]. In FIG. 10B, the entry CL_0 is inserted at index [4], which causes the other entries to move to the left by one, resulting in the entry HMPV_0 being removed from the buffer. The entry CL_0 may include motion vector predictor information of a previously encoded or decoded block.

According to some embodiments, the HMVP buffer is emptied or reset to a zero state when a condition is satisfied. The condition may be that (i) the current CU is the beginning of a CTU row and (ii) the current block is encoded/decoded using wavefront parallel processing. In wavefront parallel processing, before the encoding or decoding of a current row is completed, the encoding or decoding of another row may be started.

According to some embodiments, an HMVP_row buffer with the same size of the HMVP buffer, is used to store the entries of the HMVP buffer, after the first CTU of every CTU row is completed. Accordingly, at the beginning of a new CTU row, the HMVP buffer may be filled with the information in the HMVP_row buffer. By resetting the HMVP buffer at the end of the CTU row, and copying the contents of the HMVP_row buffer to the HMVP buffer, the blocks of the first CTU being decoded may be decoded with information from the CTU directly above the first CTU.

In some embodiments, for each tile in a picture, the HMVP_row buffer is used to store the HMVP information after the first CTU of each tile row is finished. Accordingly, for the first CTU of a new tile row, the HMVP buffer may be filled using the information from the HMVP_row buffer. In some embodiments, the HMVP_row buffer is initiated to a zero state at the beginning of a first CTU row of a tile or slice.

FIG. 11 illustrates an example picture 1100 that is divided into CTUs CTU_00 to CTU_23. CTUs CTU_00 to CTU_03 are in the first CTU row CTU_Row_[0]. CTUs CTU_10 to CTU_13 are in the second CTU row CTU_Row_[1]. CTUs CTU_20 to CTU_23 are in the third CTU_row. Each CTU in the picture 1100 may be further divided into a plurality of blocks. The blocks may be CUs or coding blocks (CBs).

In some embodiments, when wavefront parallel processing is used to encode or decode the picture 1100, at least two processor threads may be used. Each processor thread may have an associated HMVP buffer, and a shared row buffer. For example, referring to picture 1100, processor threads PT_1 and PT_2 may be used for the encoding or decoding of picture 1100. Processor thread PT_1 may be associated with history buffer HMVP_1, and processor thread PT_2 may be associated with history buffer HMVP_2. Furthermore, each of processor threads PT_1 and PT_2 may share the same history row buffer.

In some embodiments, before the first block in the first CTU (e.g., CTU_00) of picture 1100 is encoded or decoded, the associated HMVP buffer of the processor thread that encodes or decodes the CTUs in the first CTU row is loaded with initial values. The initial values may be stored in the memory of an encoder or decoder. In an another example, the associated HMVP buffer of the processor thread that encodes or decodes the CTUs in the first CTU row may initialized to a zero state. Additionally, the HMVP_row buffer may be initialized to a zero state before the first block in the first CTU (e.g., CTU_00) of picture 1100 is encoded or decoded.

Processor thread PT_1 may be used to start encoding the CTUs in CTU_Row_[0]. When the last block of CTU_00 (e.g., first CTU in CTU_Row_[0]) is encoded or decoded by PT_1, the contents of the buffer HMVP_1 are copied to the HMVP_row buffer. When the last block of CTU_03 is encoded or decoded (e.g., last CTU in CTU_Row_[0]) by PT_1 the buffer HMVP_1 is emptied.

Furthermore, when the last block of CTU_01 is encoded or decoded by PT_1, the contents of the HMVP_row buffer may be copied to the buffer HMVP_2, and the encoding or decoding of the CTUs in the next CTU row (i.e., CTU_Row_[1]) may by started by the second processor thread PT_2. In this regard, processor thread PT_2 starts encoding or decoding the CTUs of CTU_Row_[1] while the processor thread PT_1 is still encoding or decoding the CTUs of CTU_Row_[0]. When the last block of CTU_10 (e.g., first CTU in CTU_Row_[1]) is encoded or decoded by PT_2, the contents of the buffer HMVP_2 are copied to the HMVP_row buffer. When the last block of CTU_13 is encoded or decoded (e.g., last CTU in CTU_Row_[1]) by PT_2, the buffer HMVP_2 is emptied.

Additionally, when the first processor thread PT_1 has finished encoding or decoding the CTUs CTU_Row_[0], and after the contents of buffer HMVP_2 are copied to the HMVP_row buffer, the contents of the HMVP_row buffer are copied to the buffer HMVP_1, and the encoding or decoding of the CTUs in CTU_row[2] may be started by the first processor thread PT_1. In this regard, processor thread PT_1 starts encoding or decoding the CTUs of CTU_Row_

[2] while the processor thread PT_2 is still encoding or decoding the CTUs of CTU_Row_[1].

Accordingly, in the above example, by resetting the contents of buffers HMVP_1 and HMVP_2 and copying the contents of the HMVP_row buffer to buffers HMVP_1 and HMVP_2 as discussed above, the significantly advantageous features of (i) the encoding or decoding of the blocks in the first CTU of each row with relevant motion information, and (ii) the encoding and decoding of CTU rows in parallel is achieved.

Figure 12:
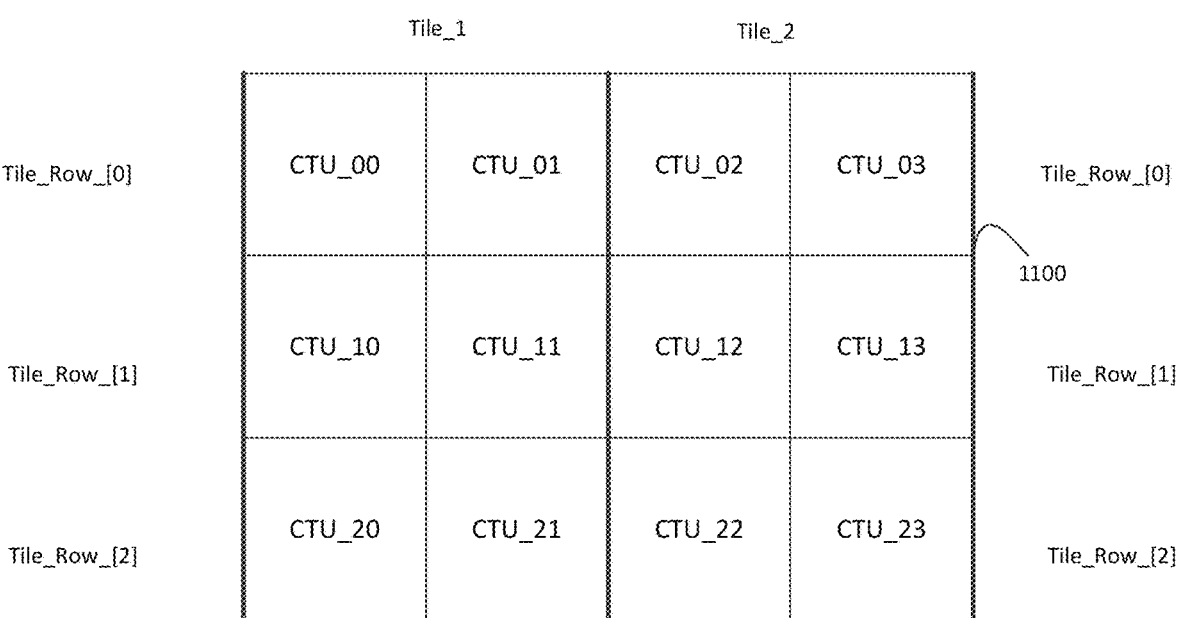
FIG. 12 illustrates an example of a picture segmented into tiles.

FIG. 12 illustrates an example of picture 1100 divided into two tiles Tile_1 and Tile_2. When wavefront parallel processing is used when encoding or decoding picture 1100, Tile_1 and Tile_2 may have separate processor threads. For example, Tile_1 may have processor threads Tile_1_PT_1 and Tile_1_PT_2, where these processor threads are associated with buffers Tile_1_HMVP_1 and Tile_1_HMVP_2, respectively. Tile_2 may have processor threads Tile_2_PTi and Tile_2_PT_2, where these processor threads are associated with buffers Tile_2_HMVP_1 and Tile_2_HMVP_2, respectively. Furthermore, the processor threads of Tile 1 may use a shared row buffer HMVP_row_1 buffer, and the processor threads of Tile 2 may use the shared row buffer HMVP_row_2.

As an example, processor thread Tile_1_PT_1 is used to process the CTUs in Tile_Row_[0] of Tile 1. In some embodiments, before the first block in the first CTU of Tile_1 (e.g., CTU_00) is encoded or decoded, the buffer Tile_1_HMVP_1 is loaded with initial values. The initial values may be stored in the memory of an encoder or decoder. In another example, the buffer Tile_1_HMVP_1 may be initialized to a zero state. Additionally, the row buffer HMVP_row_1 may be initialized to a zero state before the first block in the first CTU (e.g., CTU_00) of Tile is encoded or decoded. When the last block of CTU_00 (e.g., first CTU in CTU_Row_[0] of Tile_1) is encoded or decoded by Tile_1_PT_1, the contents of the buffer Tile_1_HMVP_1 is copied to the row buffer HMVP_row_1. When the last block of CTU_01 is encoded or decoded (e.g., last CTU in CTU_Row_[0] of Tile_1), the buffer Tile_1_HMVP_1 is reset. Furthermore, when the last block of CTU_00 is encoded or decoded, the contents of the row buffer HMVP_row_1 are copied to the buffer Tile_1_HMVP_2, and the processor thread Tile_1_PT_2 may start the encoding or decoding of the CTUs in Tile_Row_[1] of Tile 1 while the processor thread Tile_1_PT_1 is still encoding or decoding the CTUs of tile row Tile_Row [0] of Tile 1.

Tile_2 may be encoded or decoded in parallel with Tile_1. As an example, processor thread Tile_2_PT_1 is used to process the CTUs in Tile_Row_[0] of Tile 2. The buffers Tile_2_HMVP_1 and HMVP_row_2 may be initialized in the same manner as the buffers Tile_1_HMVP_1 and HMVO_row_1, respectively, as described above. When the last block of CTU_02 (e.g., first CTU in CTU_Row_[0] of Tile_2) is encoded or decoded by Tile_2_PT_1, the contents of the buffer Tile_2_HMVP_1 is copied to the row buffer HMVP_row_2. When the last block of CTU_03 is encoded or decoded (e.g., last CTU in CTU_Row_[0] of Tile_2) by Tile_2_PT_1, the buffer Tile_2_HMVP_1 is reset. Furthermore, when the last block of CTU_02 is encoded or decoded, the contents of the row buffer HMVP_row_2 are copied to the buffer Tile_2_HMVP_2, and the processor thread Tile_2_PT_2 may start the encoding or decoding of the CTUs in Tile_Row_[1] of Tile 2 while the processor thread Tile_1_PL1 is still encoding or decoding the CTUs of tile row Tile_Row[0] of Tile 2.

Figure 13:
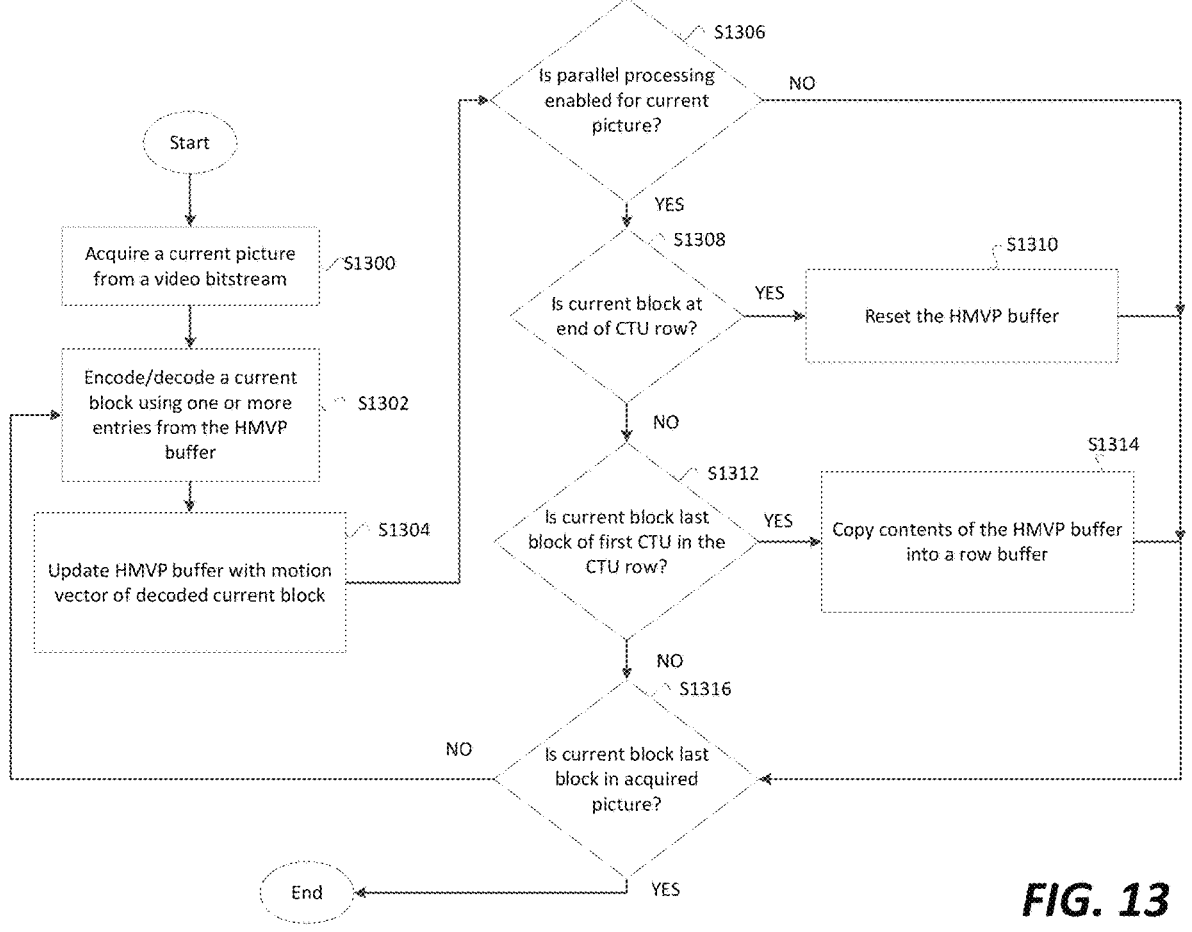
FIG. 13 illustrates an embodiment of a process performed by an encoder or a decoder.

FIG. 13 illustrates an embodiment of a process performed by an encoder such as encoder 503 or a decoder such as decoder 610. The process may start at step S1300 where a current picture is acquired from a video bitstream. For example, picture 1100 (FIG. 11) may be the acquired picture. The process proceeds to step S1302 where a current block from the current picture is encoded/decoded using one or more entries from an HMVP buffer. For example, referring to picture 1100, if the first block in CTU_00 is being encoded/decoded, the buffer HMVP_1 may be initialized to an initial state, and the first block may be encoded/decoded with one or more entries from the buffer HMVP_1 after this buffer is initialized. The process proceeds to step S1304 where the HMVP buffer is updated with motion vector information of the encoded/decoded current block.

The process proceeds to step S1306 where it is determined whether parallel processing is enabled for the current picture. For example, it may be determined that wavefront parallel processing is enabled for the picture 1100. If parallel processing is not enabled for the current picture, the process proceeds to step S1316, which is described in further detail below.

If parallel processing is enabled for the current picture, the process proceeds to step S1308 to determine whether the current encoded/decoded block is at the end of the CTU row. For example, referring to picture 1100, if the current block that is encoded/decoded is the last block of CTU_03, then the current encoded/decoded block is at the end of CTU_Row_[0]. If the current encoded/decoded block is at the end of the CTU row, the process proceeds to step S1310 where the HMVP buffer is reset (e.g., emptied). For example, if processor thread PT_1 is used to encode or decode the CTUs of CTU_Row_[0], the buffer HMVP_1 is reset after the last block of CTU_03 is processed. The process proceeds from step S1310 to step S1316, which is described in further detail below.

If the current encoded/decoded block is not the end of the CTU row, the process proceeds to step S1312 to determine whether the current encoded/decoded block is the last block of the first CTU in the CTU row. If the current encoded/decoded block is the last block of the first CTU in the CTU row, the process proceeds to step S1314 where the contents of the HMVP buffer are copied into the HVMP_row buffer. For example, referring to picture 1100, if the current encoded/decoded block is the last block of CTU_00, the contents of the buffer HVMP_1 buffer are copied into the contents of the HMVP_row buffer before the first block of CTU_01 is encoded/decoded. As discussed above, after the last block of CTU_01 is encoded/decoded, the contents of the HMVP_row buffer are copied to the buffer HMVP_2, where the processor thread PT_2 can start encoding/decoding the CTUs of CTU_Row_[1] while the processor thread is still encoding or decoding the CTUs of CTU_Row_[0]. The process proceeds from step S1314 to step S1316, which is described in further detail below.

If the current encoded/decoded block is not the last block of the first CTU in the CTU row, the process proceeds to step S1316 to determine if the current encoded/decoded block is the last block in the acquired picture. If the current encoded/decoded block is the last block in the acquired picture, the process in FIG. 13 ends. For example, if the current encoded/decoded block is the last block of CTU_23, the process in FIG. 13 is completed. If the current encoded/decoded block is not the last block in the acquired picture, the process returns from step S1316 to step S1302.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
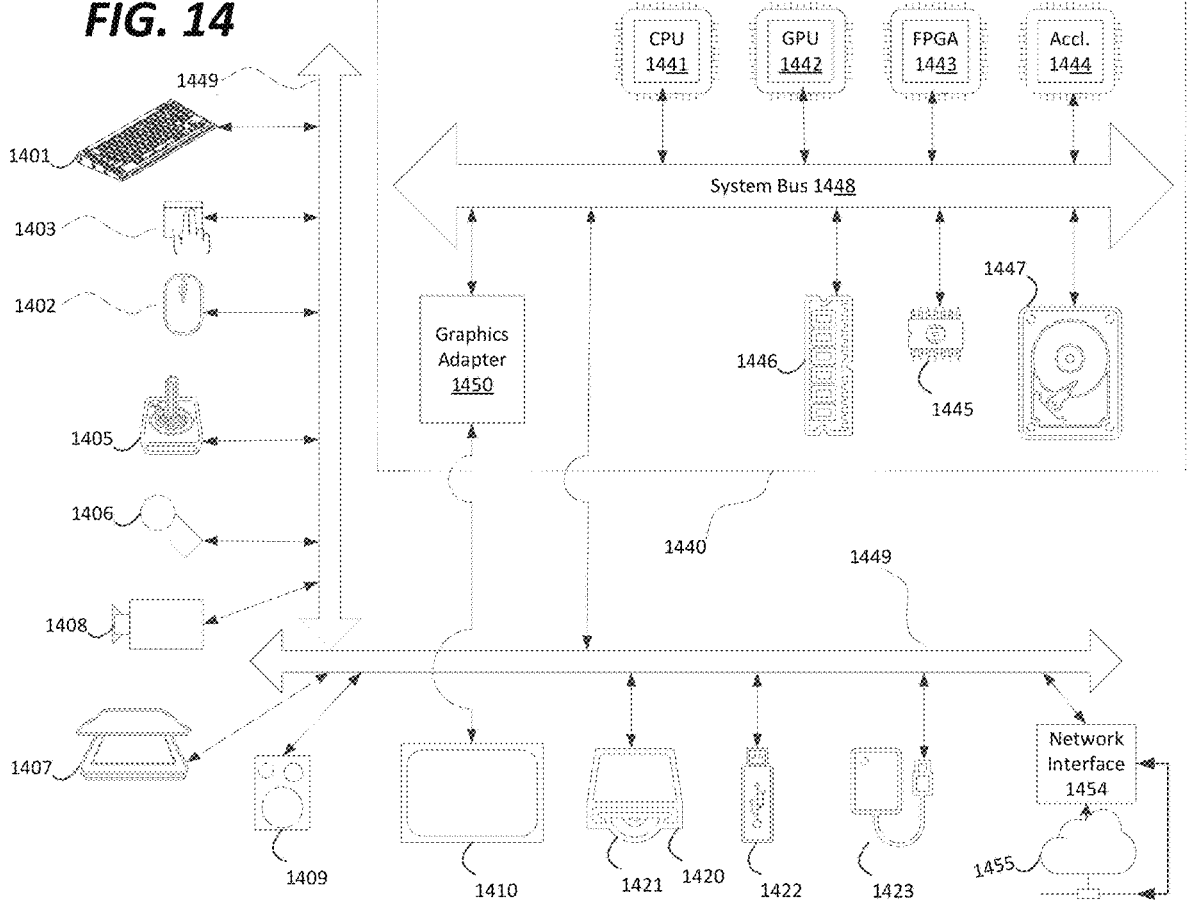
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hard-wired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect

24

FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a decoder, the method including acquiring a current picture from a coded video bitstream, the current picture being segmented into a plurality of units, each unit divided into a plurality of blocks, the plurality of blocks in each unit being arranged as a grid; decoding, for one of the units, a current block from the plurality of blocks using an entry from a history motion vector (HMVP) buffer; updating the HMVP buffer with a motion vector of the decoded current block; determining whether a condition is satisfied, the condition specifying that (i) the current block is a beginning of a row included in the grid of the one of the units, and (ii) the plurality of blocks are decoded in accordance with a parallel process; and in response to determining that the condition is satisfied, resetting the HMVP buffer.

(2) The method according to feature (1), further including determining whether the current block is a last block of a first unit of the row; and in response to determining that the current block is the last block of the first unit of the row, copying contents of the HMVP buffer into a row buffer.

(3) The method according to feature (2), further including in response to determining that the current block is a last block of a second unit of the row, copying contents of the row buffer into another HMVP buffer for parallel decoding of the next row.

(4) The method according to any one of features (1)-(3), in which the HMVP buffer is a first-in-first-out (FIFO) buffer, and in which the updating the HMVP buffer with the motion vector includes storing the motion vector at a last entry of the HMVP buffer and deleting a first entry of the HMVP buffer.

(5) The method according to any one of features (1)-(4), in which the unit is a coding tree unit (CTU).

(6) The method according to any one of features (2)-(5), in which the unit is a tile, the decoded one of the units is a first tile, and the first tile and a second tile from the plurality of units are decoded in parallel.

(7) A video decoder for video decoding including processing circuitry configured to: acquire a current picture from a coded video bitstream, the current picture being segmented into a plurality of units, each unit divided into a plurality of blocks, the plurality of blocks in each unit being arranged as a grid, decode, for one of the units, a current block from the plurality of blocks using an entry from a history motion vector (HMVP) buffer, update the HMVP buffer with a motion vector of the decoded current block, determine whether a condition is satisfied, the condition specifying that (i) the current block is a beginning of a row included in the grid of the one of the units, and (ii) the plurality of blocks are decoded in accordance with a parallel process, and in response to the determination that the condition is satisfied, reset the HMVP buffer.

(8) The video decoder according to feature (7), in which the processing circuitry is further configured to: determine whether the current block is a last block of a first unit of the row, and in response to the determination that the current block is the last block of the first unit of the row, copying contents of the HMVP buffer into a row buffer.

(9) The video decoder according to feature (8), in which the processing circuitry is further configured to: in response to the determination that the current block is a last block of a second unit of the row, copying contents of the row buffer into another HMVP buffer for parallel decoding of the next row.

(10) The video decoder according to any one of features (7)-(9), in which the HMVP buffer is a first-in-first-out (FIFO) buffer, and in which the updating the HMVP buffer with the motion vector includes storing the motion vector at a last entry of the HMVP buffer and deleting a first entry of the HMVP buffer.

(11) The video decoder according to any one of features (7)-(10), in which the unit is a coding tree unit (CTU).

(12) The video decoder according to any one of features (8)-(11), in which the unit is a tile, the decoded one of the units is a first tile, and the first tile and a second tile from the plurality of units are decoded in parallel.

(13) A non-transitory computer readable medium having instructions stored therein, which when executed by a processor in a video decoder causes the processor to execute a method including acquiring a current picture from a coded video bitstream, the current picture being segmented into a plurality of units, each unit divided into a plurality of blocks, the plurality of blocks in each unit being arranged as a grid; decoding, for one of the units, a current block from the plurality of blocks using an entry from a history motion vector (HMVP) buffer; updating the HMVP buffer with a motion vector of the decoded current block; determining whether a condition is satisfied, the condition specifying that (i) the current block is a beginning of a row included in the grid of the one of the units, and (ii) the plurality of blocks are decoded in accordance with a parallel process; and in response to determining that the condition is satisfied, resetting the HMVP buffer.

(14) The non-transitory computer readable medium according to feature (13), the method further including determining whether the current block is a last block of a first unit of the row; and in response to determining that the current block is the last block of the first unit of the row, copying contents of the HMVP buffer into a row buffer.

(15) The non-transitory computer readable medium according to feature (14), the method further comprising: in response to determining that the current block is a last block of a second unit of the row, copying contents of the row buffer into another HMVP buffer for parallel decoding of the next row.

(16) The non-transitory computer readable medium according to any one of features (13)-(15), in which the HMVP buffer is a first-in-first-out (FIFO) buffer, and in which the updating the HMVP buffer with the motion vector includes storing the motion vector at a last entry of the HMVP buffer and deleting a first entry of the HMVP buffer.

(17) The non-transitory computer readable medium according to any one of features (13)-(16), in which the unit is a coding tree unit (CTU).

(18) The non-transitory computer readable medium according to any one of features (14)-(17), in which the unit is a tile, the decoded one of the units is a first tile, and the first tile and a second tile from the plurality of units are decoded in parallel.

What is claimed is:

1. A video decoder, comprising:
processing circuitry configured to:
acquire coded information of a current picture from a coded video bitstream, the current picture being segmented into a plurality of tiles, each tile comprising a plurality of rows, each row having a plurality of units, each unit being divided into a plurality of blocks, the coded information indicating that a first unit in a first row of a first tile of the plurality of tiles is decoded using inter prediction;
prior to decoding the first tile of the plurality of tiles, initialize a shared row buffer that is shared among multiple processor threads associated with the first tile, each of the multiple processor threads having a corresponding history motion vector predictor (HMVP) buffer;
decode the first unit of the plurality of units in the first row of the first tile by a first processor thread of the multiple processor threads and using a corresponding first HMVP buffer, the first unit being decoded chronologically first among the plurality of units in the first row;
when all of the plurality of blocks in the first unit have been decoded,
copy contents of the first HMVP buffer corresponding to the first processor thread into the shared row buffer, the contents corresponding to motion vectors of decoded blocks included in the first unit;
copy contents of the shared row buffer into a second HMVP buffer corresponding to a second processor thread of the multiple processor threads; and
start decoding of a unit in a second row of the plurality of rows by the second processor thread using the second HMVP buffer; and
when the plurality of units in the first row of the first tile has been decoded, reset the first HMVP buffer.

2. The video decoder according to claim 1, wherein the first HMVP buffer and the second HMVP buffer are first-in-first-out (FIFO) buffers, and the processing circuitry is configured to update the first HMVP buffer and the second HMVP buffer by storing a motion vector at a last entry of one of the first HMVP buffer and the second HMVP buffer and deleting a first entry of the one of the first HMVP buffer and the second HMVP buffer.

3. A method of video encoding, the method comprising:
acquiring a current picture to be coded, the current picture being segmented into a plurality of tiles, each tile comprising a plurality of rows, each row having a plurality of units, each unit being divided into a plurality of blocks;
prior to encoding a first tile of the plurality of tiles, initializing a shared row buffer that is shared among multiple processor threads associated with the first tile, each of the multiple processor threads having a corresponding history motion vector predictor (HMVP) buffer;
encoding a first unit of the plurality of units in a first row of the first tile by a first processor thread of the multiple processor threads and using a corresponding first HMVP buffer, the first unit being encoded chronologically first among the plurality of units in the first row;

when all of the plurality of blocks in the first unit have been encoded, copying contents of the first HMVP buffer corresponding to the first processor thread into the shared row buffer, the contents corresponding to motion vectors of encoded blocks included in the first unit;

copying contents of the shared row buffer into a second HMVP buffer corresponding to a second processor thread of the multiple processor threads; and starting encoding of a unit in a second row of the plurality of rows by the second processor thread using the second HMVP buffer;

when the plurality of units in the first row of the first tile have been encoded, resetting the first HMVP buffer; and encoding information indicating that the first unit in the first row of the first tile is encoded using inter prediction.

4. The method according to claim 3, wherein the first HMVP buffer and the second HMVP buffer are first-in-first-out (FIFO) buffers; and the method further comprises updating the first HMVP buffer and the second HMVP buffer by storing a motion vector at a last entry of one of the first HMVP buffer and the second HMVP buffer and deleting a first entry of the one of the first HMVP buffer and the second HMVP buffer.

5. The method according to claim 3, further comprising:

prior to encoding a second tile of the plurality of tiles, initializing a second shared row buffer that is shared among multiple processor threads associated with the second tile, each of the multiple processor threads associated with the second tile having a corresponding HMVP buffer;

encoding a first unit of the plurality of units in a first row of the second tile by a third processor thread of the multiple processor threads associated with the second tile and using a corresponding third HMVP buffer, the first unit being encoded chronologically first among the plurality of units in the first row of the second tile;

when all of the plurality of blocks in the first unit of the first row of the second tile have been encoded, copying contents of the third HMVP buffer corresponding to the third processor thread into the second shared row buffer, the contents corresponding to motion vectors of encoded blocks included in the first unit of the first row of the second tile;

copying contents of the second shared row buffer into a fourth HMVP buffer corresponding to a fourth processor thread of the multiple processor threads; and starting encoding of a unit in a second row of the plurality of rows of the second tile by the fourth processor thread using the fourth HMVP buffer; and when the plurality of units in the first row of the second tile have been encoded, resetting the third HMVP buffer.

6. The method according to claim 5, wherein the second tile is encoded in parallel with the first tile.

7. The method according to claim 3, further comprising:

prior to the encoding the first unit of the plurality of units in the first row of the first tile, loading the first HMVP buffer with pre-stored initial values.

8. The method according to claim 3, further comprising:

updating the first HMVP buffer with motion vector information of each of the plurality of units in the first row of the first tile after the respective unit is encoded.

9. The method according to claim 3, further comprising:

determining whether wavefront parallel processing is enabled for the current picture; and when the wavefront parallel processing is enabled for the current picture, performing the initializing the shared row buffer, the copying the contents of the first HMVP buffer corresponding to the first processor thread into the shared row buffer, and the copying the contents of the shared row buffer into the second HMVP buffer.

10. A non-transitory computer-readable storage medium storing instructions which when executed by a processor cause the processor to perform a method encoding a bitstream comprising:

acquiring a current picture to be coded, the current picture being segmented into a plurality of tiles, each tile comprising a plurality of rows, each row having a plurality of units, each unit being divided into a plurality of blocks;

prior to encoding a first tile of the plurality of tiles, initializing a shared row buffer that is shared among multiple processor threads associated with the first tile, each of the multiple processor threads having a corresponding history motion vector predictor (HMVP) buffer;

encoding a first unit of the plurality of units in a first row of the first tile by a first processor thread of the multiple processor threads and using a corresponding first HMVP buffer, the first unit being encoded chronologically first among the plurality of units in the first row;

when all of the plurality of blocks in the first unit have been encoded, copying contents of the first HMVP buffer corresponding to the first processor thread into the shared row buffer, the contents corresponding to motion vectors of encoded blocks included in the first unit;

copying contents of the shared row buffer into a second HMVP buffer corresponding to a second processor thread of the multiple processor threads; and starting encoding of a unit in a second row of the plurality of rows by the second processor thread using the second HMVP buffer;

when the plurality of units in the first row of the first tile have been encoded, resetting the first HMVP buffer; and transmitting the bitstream that includes the first unit of the plurality of units in the first row of the first tile.

11. The non-transitory computer-readable storage medium according to claim 10, wherein the first HMVP buffer and the second HMVP buffer are first-in-first-out (FIFO) buffers, and the first HMVP buffer and the second HMVP buffer are updated by storing a motion vector at a last entry of one of the first HMVP buffer and the second HMVP buffer and deleting a first entry of the one of the first HMVP buffer and the second HMVP buffer.

* * * * *